United States Patent
Ma

(10) Patent No.: US 8,194,916 B2
(45) Date of Patent: Jun. 5, 2012

(54) METHOD AND APPARATUS FOR MONITORING TREE GROWTH

(75) Inventor: Zhenkui Ma, Kent, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 759 days.

(21) Appl. No.: 12/344,001

(22) Filed: Dec. 24, 2008

(65) Prior Publication Data

US 2010/0158314 A1    Jun. 24, 2010

(51) Int. Cl.
*G06K 9/00* (2006.01)

(52) U.S. Cl. ........................................ 382/100

(58) Field of Classification Search .................. None
See application file for complete search history.

(56) References Cited

U.S. PATENT DOCUMENTS

| | | | |
|---|---|---|---|
| 6,008,492 A * | 12/1999 | Slater et al. ................. | 250/334 |
| 6,841,780 B2 * | 1/2005 | Cofer et al. ................. | 250/341.1 |
| 6,854,337 B1 * | 2/2005 | Tarara et al. ................. | 73/826 |
| 7,058,197 B1 | 6/2006 | McGuire | |
| 7,212,670 B1 * | 5/2007 | Rousselle et al. ............. | 382/173 |
| 7,400,770 B2 | 7/2008 | Keaton | |
| 7,660,430 B2 * | 2/2010 | Navulur et al. ............... | 382/100 |
| 7,925,117 B2 * | 4/2011 | Hamza et al. ................. | 382/294 |
| 2003/0086604 A1 * | 5/2003 | Oniyama ..................... | 382/154 |
| 2003/0218674 A1 * | 11/2003 | Zhao et al. ................... | 348/140 |
| 2006/0245657 A1 * | 11/2006 | Lin et al. ..................... | 382/236 |
| 2008/0031492 A1 * | 2/2008 | Lanz ............................ | 382/103 |
| 2008/0046184 A1 | 2/2008 | Bortolot | |
| 2009/0022359 A1 * | 1/2009 | Kang et al. ................... | 382/100 |
| 2010/0158314 A1 * | 6/2010 | Ma ............................... | 382/103 |
| 2011/0122245 A1 * | 5/2011 | Sinha .......................... | 348/143 |

* cited by examiner

*Primary Examiner* — Brian P Werner
*Assistant Examiner* — Tahmina Ansari
(74) *Attorney, Agent, or Firm* — Perkins Coie LLP

(57) ABSTRACT

A system for identifying forest stands within an area of interest that are exhibiting abnormal growth determines a relationship between vegetation index (VI) values determined from a first and a second image of the area of interest. From the relationship, an expected or predicted VI value for each forest stand is determined and compared with the actual VI value computed for the forest stand from the first image. Those forest stands with a difference between the actual and predicted VI values that exceed a threshold are identified as exhibiting abnormal growth.

9 Claims, 4 Drawing Sheets

$VI_X = a + C \cdot VI_{X-1} + \varepsilon$

METHOD AND APPARATUS FOR MONITORING TREE GROWTH

The present disclosure relates to forest management systems and, in particular, to systems for detecting forest stands exhibiting abnormal growth.

BACKGROUND

Managers of forest lands are responsible for managing the growth and harvesting of forest stands that may extend over vast geographical areas. To manage the stands, a manager may need to know such things as when a stand needs fertilizer, has been affected by a natural disaster such as a wind storm, avalanche, etc., or is subject to an infestation by insects or disease. Because the areas involved in forest management are so large, it is generally cost prohibitive to physically inspect every stand in an area on a regular basis. Therefore, there is a need for a system that can use remotely gathered data to alert forest managers to stands that may need to be physically inspected and/or actively managed.

SUMMARY

To address these and other concerns, the present disclosure is directed to a system and method for identifying forest stands that exhibit an abnormal growth using remotely gathered data. A computer system receives at least two images of an area of interest including a number of forest stands. The images include red and near infrared pixel data for a previous image and a current image of the area of interest. In one embodiment, boundaries of the forest stand areas are overlayed onto the images and the average red and infrared data values for the pixels in the area of each forest stand are determined. From the average red and near infrared values, a vegetation index (VI) value for the area of each forest stand is computed. A relationship between the VI values computed for the forest stand areas from the previous image and those computed from the current image are determined. The VI values computed for the areas of the forest stands from the current image are compared with a predicted VI value for the same forest stand as determined from the relationship. Those forest stands exhibiting a sufficiently large difference between the computed and predicted VI values are flagged as exhibiting potentially abnormal growth rates.

In another embodiment, the disclosure relates to a computer storage media having a sequence of instructions stored thereon that are executable by a computer to perform a method of identifying forest stands in an area of interest that exhibit unexpected growth, by storing a first and a second image of the area of interest in a memory, wherein the first and second images include near infrared and red visible light pixel data. The instructions include instructions for dividing the pixels in the first and second image into groups associated with a number of forest stands and for determining a vegetative index value for the group of pixels in the first and second images associated with each forest stand. The instructions also include instructions for computing a relationship between the VI values determined from the first and second images, comparing VI values determined for the group of pixels in the first image associated with a forest stand with a predicted VI value determined for the same forest stand by the computed relationship to determine difference values and using the difference values to identify forest stands in the area of interest exhibiting unexpected growth.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed technology will become more readily appreciated as the same become better understood by reference to the following detailed description, when taken in conjunction with the accompanying drawings, wherein.

DETAILED DESCRIPTION

As indicated above, the subject matter of the present disclosure relates to methods and systems for remotely monitoring the growth of trees in a number of forest stands that are dispersed over a geographic area of interest. Forest managers typically divide or categorize trees within a forest area into a number of forest stands. These stands are generally defined to include a group of homogeneous trees, i.e., trees of the same species, trees of the same age, trees growing in the same soil type, etc. Alternatively, a forest stand may be defined by legal or geographical boundaries such as trees on a certain hillside or owned by the same individual or corporation, etc.

One of the tasks of a forest manager is to make decisions regarding which forest stands need to be inspected and actively managed. Active management may include such tasks as fertilizing, treating for insects or disease, thinning or harvesting. As indicated above, most forests under active management are dispersed over wide geographic areas that make it either too costly or impractical to physically inspect each forest stand on a regular basis. Forest managers therefore must often make decisions regarding how the various forest stands are to be managed without physically inspecting each stand.

One common technique for managing a forest stand is to use remotely obtained images of the forest, such as satellite or aerial images. Such images can be analyzed to detect changes in forest canopy, which may be indicative of a natural disaster such as a wind storm, landslide, avalanche, etc., or the presence of insects or disease. While the use of satellite or aerial images reduces the need to physically inspect a site, such images do not provide information providing how well a particular forest stand is growing compared with other forest stands included in the image. It is helpful for a forest manager to be able to identify those stands that are not growing as well as expected so that decisions of where to expend resources to improve the health of the forest stands or to harvest trees can be made.

Figure 1:
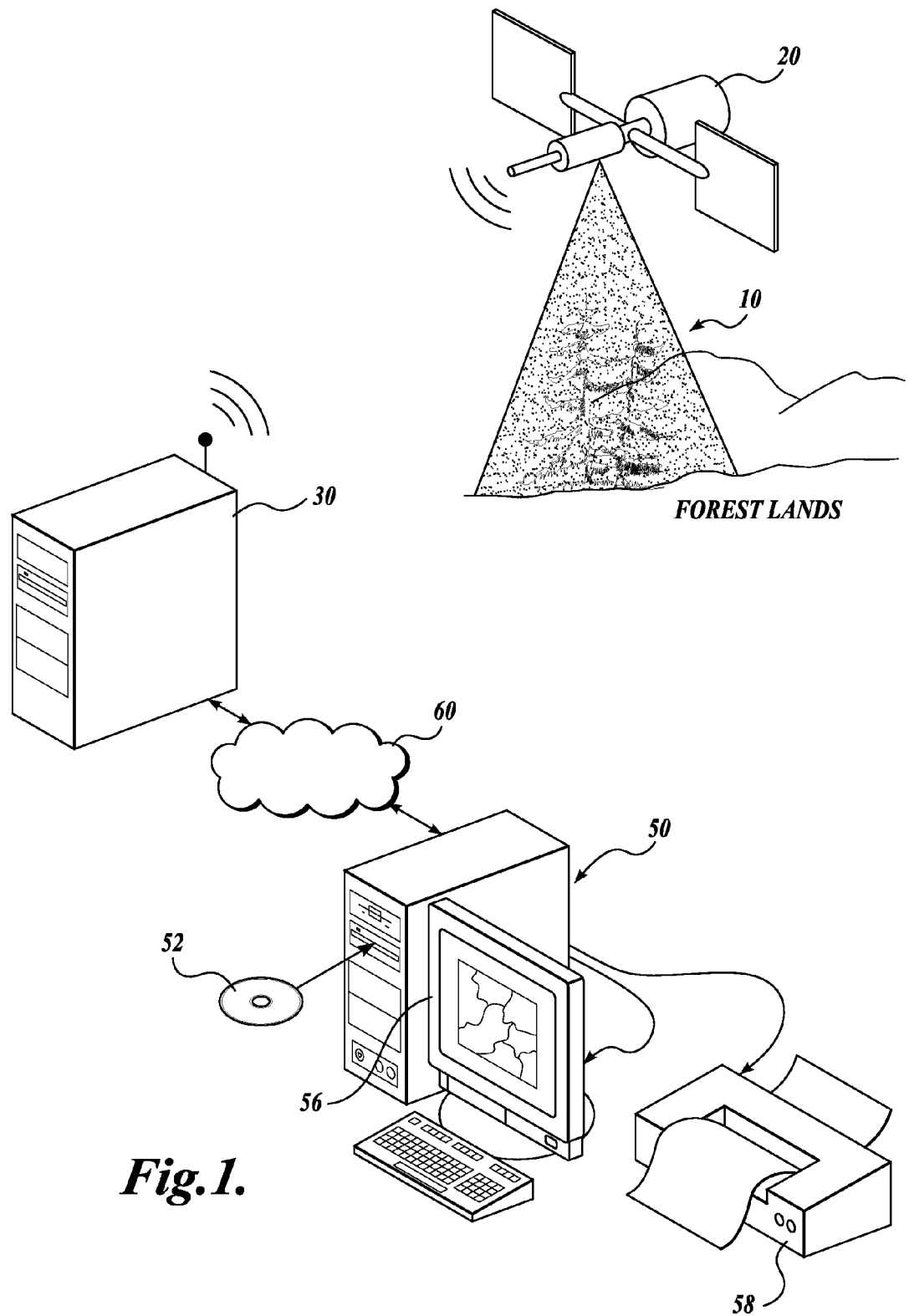
FIG. 1 illustrates one embodiment of a computer system that can implement the system for monitoring tree growth in accordance with the present disclosure.

FIG. 1 illustrates a block diagram of a computer system 50 that is useful for identifying forest stands in an area of interest that are not growing as expected. In the embodiment shown, images of a forest 10 are obtained from a satellite 20 or aircraft (not shown). In one embodiment, the images are obtained from the Landsat satellite imaging system that produces images with pixel data in the visible and near infrared spectral bands. The images from the satellite or aerial imaging system are typically stored on a remote computer 30 for purchase and/or download by interested parties such as public or private companies, universities, governments, or individuals.

The computer system 50 executes a series of instructions contained on a computer readable storage media 52 such as a CD-ROM, DVD, hard disk, flash memory, etc., that cause the computer system to analyze the images of the forest and flag or otherwise indicate to a forest manager forest any stands that are growing at a rate other than as expected. The images of the forest may be displayed on a video display unit 56, printed on paper or other media with a printer 58, or stored on a computer readable storage media such as a hard drive (not shown) for later analysis. The computer system 50 obtains and stores two or more images of the forest. In one embodiment, these images are referred to as a previous image and a current image. The images may be obtained from the remote computer system 30 via a wired or wireless communication link such as the Internet 60. Alternatively, the images could be stored and retrieved from a computer readable storage media such as CD-ROM, hard drive, etc.

Figure 2:
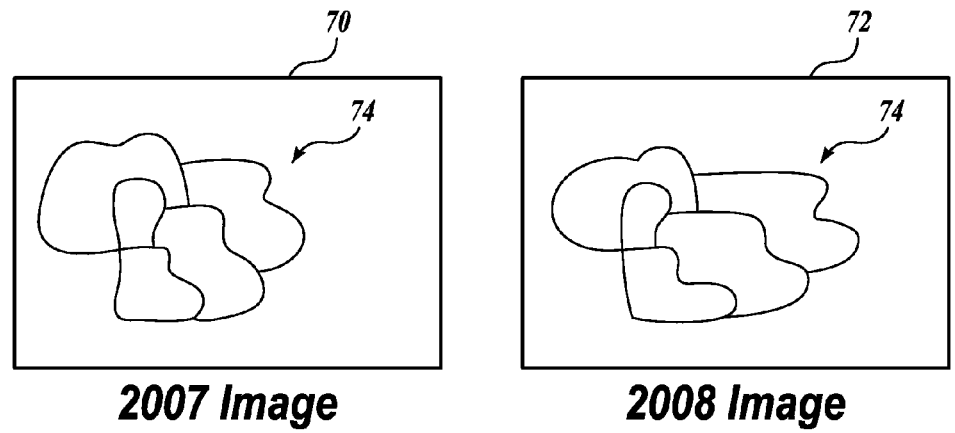
FIG. 2 illustrates a pair of time-spaced images of an area of interest and a comparison of the vegetation indices computed from each image.
Figure 2:
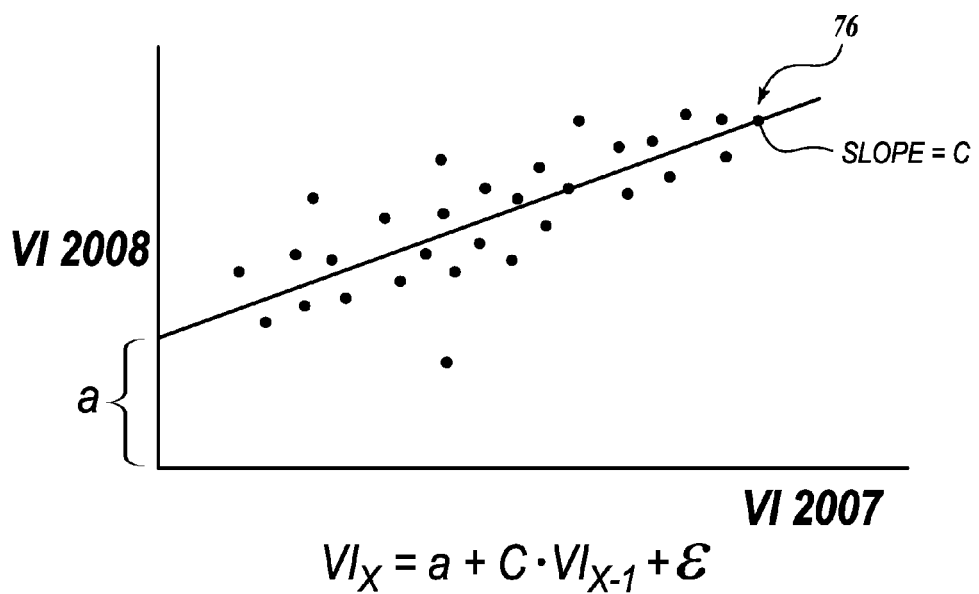

FIG. 2 illustrates a pair of images 70, 72 of a forest. The images are preferably time-spaced such as taken one year apart. In addition, the current and previous images are also preferably obtained at the same time of year so that the leaves of the trees will be in a similar growing stage. In the example shown, the first image 70 is the previous image and the second image 72 is the current image. Typically, the current image is an image of the forest that was taken within the past year. Each pixel in the previous and current image has spectral data for multiple bands including a red visible band and a near infrared band. As indicated above, in one embodiment, the images are Landsat images. However, other satellite or aerial images that include red spectral and near infrared spectral data could also be used. The boundaries 74 of the individual forest stands within the forest area are overlayed on the images 70, 72 so that a forest manager can simultaneously view the image of the forest and the boundaries of the individual forest stands. As indicated above, these forest stands may be defined by legal or geographic boundaries or may be defined by other criteria such as the tree species, tree age, soil type or other factor(s) that define a homogeneous group of trees.

To identify forest stands that are not growing as expected, a vegetation index (VI) is computed for each forest stand. To compute the vegetation index, the average data values for the red spectral band and the near infrared band are determined for the pixels within the boundaries of a forest stand in both the previous and the current image. From the average values, the vegetation index (VI) is computed by dividing the average infrared data value for the forest stand area by the average red spectral data for the forest stand area. However, as will be appreciated by those skilled in the art, other formulas for computing the vegetation index, such as the ratio of the sum and difference of the average red and infrared spectral data, could be used.

To identify forest stands that are not growing as expected, a relationship 76 between the vegetation index values computed from the previous image 70 and the vegetation index values computed from the current image 72 is determined. In one embodiment of the disclosed technology, the relationship 76 is a regression function that defines a best-fit line between the vegetation index values computed from the previous and current images of the forest. The regression function typically takes the form of Equation 1 below.

$$VI_X = \alpha + C \cdot VI_{X-1} + \epsilon \quad (1)$$

Where $VI_x$ is the VI value computed from the spectral data in the current image, $VI_{X-1}$ is the VI value computed from the spectral data in the previous image, $\alpha$ indicates the overall growth rate of the forest stands between the previous and current image and C is the slope of the regression, which is indicative of whether the trees with smaller vegetation indices grew more than the trees with the larger vegetation indices or vice versa. The value, $\epsilon$, is an error value that represents the difference between a predicted VI value and a VI value determined from the near infrared and red light spectral data for the stand in the current image.

The error or difference between the computed and predicted VI values is a measure of how well a stand is growing compared with all other forest stands contained in the images of the area of interest.

To identify those forest stands that are not growing as expected, the VI value for each forest stand is computed from the current image and compared with a predicted VI value. In one embodiment, the predicted VI value for a stand is determined by the equation $\alpha + C*VI_{x-1}$ where $\alpha$ and C are constants determined by the calculated regression function and $VI_{x-1}$ is the VI value calculated for the stand using the spectral data in the previous image. Those forest stands that have an error value $\epsilon$ (i.e. a difference between the VI calculated from the current image and the predicted VI value) that exceeds some predetermined threshold value are flagged or otherwise marked for a forest manager as possibly exhibiting abnormal growth rates.

In one embodiment of the invention, it has been found that a typical regression function for Landsat images spaced one year apart has the form:

$$VI_X = 0.805 + 0.77 VI_{X-1} + \epsilon \quad (2)$$

Where $VI_{X-1}$ is the VI value determined from the spectral data in the previous image and $VI_X$ is the actual VI value determined from the spectral data in the current image.

Figure 3:
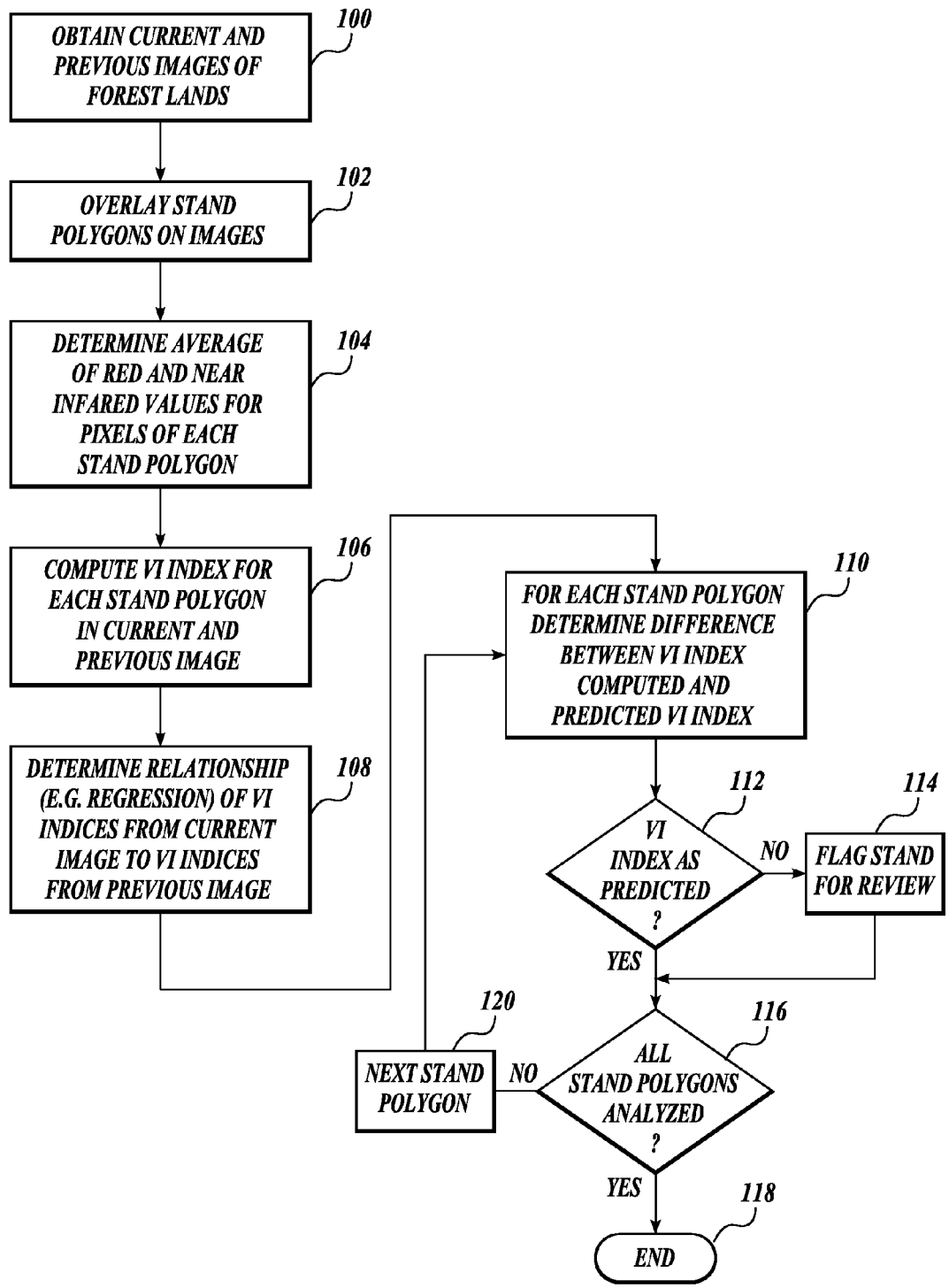
FIG. 3 shows steps performed in accordance with one embodiment of the present disclosure to monitor tree growth.

FIG. 3 illustrates a series of steps performed by a computer in accordance with one embodiment of the disclosed technology to identify forest stands or areas of trees that are not growing as expected. Although the steps shown are described in a particular order, it will be appreciated that the steps could be performed in a different order or that alternative or additional steps could be performed in order to achieve the functionality described.

At 100, the computer system obtains at least one current and at least one previous image of a forest or other area of interest. At 102, the computer systems overlays forest stand boundaries that are defined as polygons onto the current and previous images. Typically, the forest stand polygons are set by a forest manager or forest management computer program and stored in a database or in some other computer-readable format.

At 104, the average red and near infrared spectral data values for the pixels in the areas of the forest stand polygons in the previous and current images are determined. At 106, the VI values for each forest stand polygon in the current and previous images are computed.

At 108, a relationship between the VI values computed from the previous and current images of the area of interest are determined. In one embodiment, a regression function is determined that describes a best-fit line between the VI values computed for the forest stands in the current and previous images.

At 110, the computer system analyzes each forest stand polygon in the current image and determines the difference between the VI value computed from the current image and a predicted VI value as determined from the regression function. At 112, it is determined if the VI value for a forest stand calculated from the current image differs by more than a threshold value compared to the predicted VI value. In one embodiment, the threshold value is set to be about 0.5. Alternatively, a forest manager may set a threshold value based on experience or other statistical data to determine what constitutes an error or difference that indicates a stand is exhibiting abnormal growth.

If the difference between the predicted and actual VI value calculated for a stand is greater than the threshold, the forest stand is flagged for possible review and/or physical inspection by a forest manager or crew at 114. The flagging may involve coloring the forest stand a different color from surrounding forest stands so that it is visually distinguishable on a video image or printout of the image of the forest. Alternatively, the computer can generate lists that describe the location of the forest stands that were flagged. At 116, it is determined if all the forest stand polygons have been analyzed. If so, processing ends at 118. If not, the next forest stand polygon is analyzed and processing returns to step 110 until each forest stand polygon has been analyzed.

Figure 4:
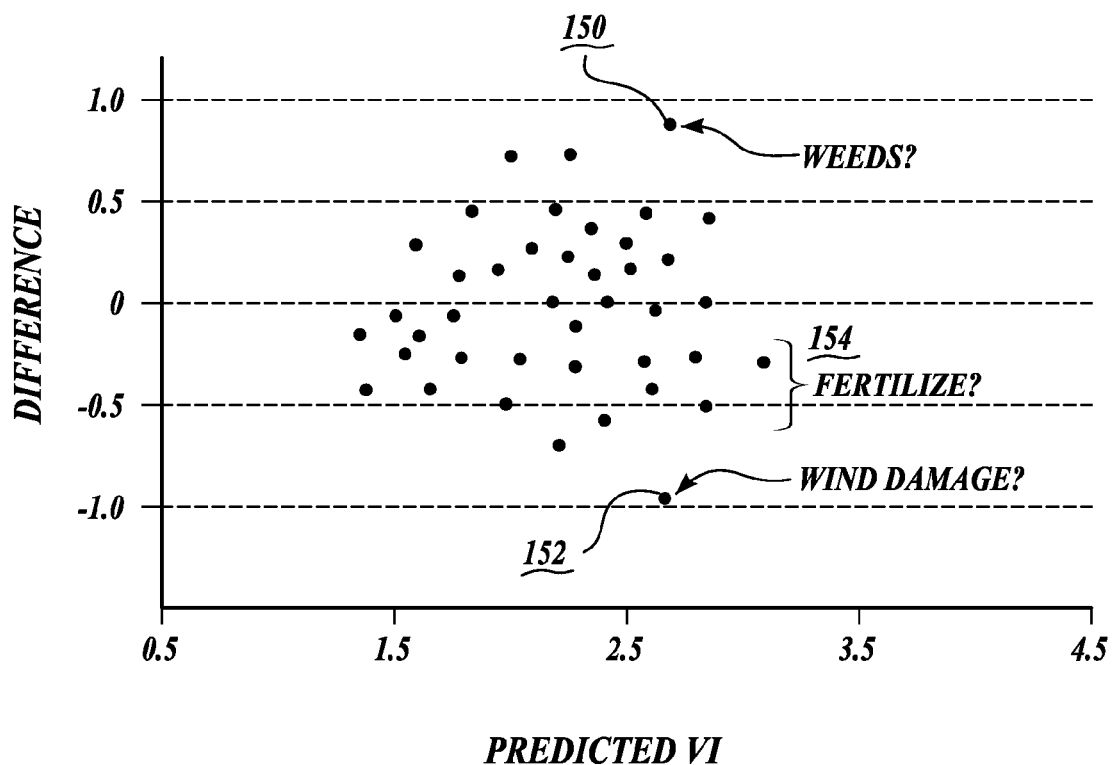
FIG. 4 illustrates a plot of differences between predicted vegetation index values and computed vegetation index values.

FIG. 4 shows a representative plot of differences between computed VI values for the forest stands in a current image and the predicted VI values as determined by the regression function. Those forest stands having a computed VI value that is greater than the predicted VI value are generally indicative of healthy forest stands and may not need any additional active forest management techniques applied. However, a large positive difference between a computed VI value and a predicted VI value such as that indicated by point 150 may indicate that other vegetative matter, such as weeds, are growing at the site of the forest stand. Therefore, forest stands with abnormally large positive differences between computed and predicted VI values, may also be flagged for possible inspection and/or treatments.

Large negative differences between a computed VI value and a predicted VI value for a forest stand, such as that indicated by point 152, may indicate an environmental event has occurred at the stand, such as trees blown down in a wind storm, landslide, or avalanche. Alternatively, trees at the site may have been illegally harvested or subject to disease or insects. Therefore, these stands may be flagged for physical inspection and possible active management techniques. Moderate negative differences, such as those indicated by points 154, may be flagged for inspection and possible active management, such as applying fertilizer in order to improve tree growth in associated forest stands.

As will be appreciated by those of ordinary skill in the art, the disclosed technology allows a forest manager or other individual to identify forest stands within an area of interest that are exhibiting abnormal growth. The forest manager can use the identified forest stands to determine if some action should be taken to improve tree health in the stand. Alternatively, the present invention can also be used to identify those forest stands that are growing exceptionally well. Such information could be used to investigate the reasons for such improved growth, which may include the identification of trees genetically predisposed to high growth rates.

While illustrative embodiments have been illustrated and described, it will be appreciated that various changes can be made therein without departing from the scope of the invention. For example, although the relationship between VI values computed from the previous and current image are described with a regression function, it will be appreciated that other mathematical data plotting functions such as a curvilinear best fit line etc. could also be used. It is therefore intended that the scope of the invention be determined from the following claims and equivalents thereof.

The embodiments of the invention in which an exclusive property or privilege is claimed are defined as follows:

1. A system for identifying a forest stand in an area of interest that is growing at a rate that is faster or slower than predicted, comprising:
   a computer that is configured to execute a series of program instructions that cause the computer to:
   store a current and a previous image of the area of interest in a memory, wherein the current and previous images include near infrared and red visible light pixel data;
   divide the pixels in the current and previous image into groups associated with forest stands;
   determine a vegetative index (VI) value for the group of pixels associated with the forest stands in the current and previous images;
   compute a relationship between the VI values determined from the previous and current images;
   compare a VI value determined for a group of pixels associated with a forest stand in the current image with a predicted VI value for the same group of pixels as determined from the relationship to determine a difference value; and
   use the difference value to produce an indication that a forest stand associated with a group of pixels is growing faster or slower than predicted.

2. The system of claim 1, wherein the relationship is a regression function.

3. The system of claim 1, wherein the VI value for a group of pixels associated with a forest stand is computed by determining a ratio of an average of near infrared pixel data and red visible pixel data for the pixels associated with the forest stand.

4. The system of claim 1, wherein the computer is configured to execute a series of instructions to print a list of forest stands that are identified as exhibiting a growth rate that is faster or slower than predicted.

5. The system of claim 1, wherein the computer is configured to execute a series of instructions that cause the computer to display an image of the forest stands wherein the forest stands identified as exhibiting a growth rate that is faster or slower than predicted are highlighted.

6. The system of claim 1, wherein the computer is configured to execute a series of instructions that cause the computer to store a record of those forest stands that are identified as exhibiting a growth rate that is faster or slower than predicted.

7. A non-transitory, computer readable storage media having a sequence of instructions stored thereon that are executable by a computer to perform a method of identifying forest stands in an area of interest that exhibit unexpected growth, by:
   storing a first and a second image of the area of interest in a memory, wherein the first and second images include near infrared and red visible light pixel data;
   dividing the pixels in the first and second images into groups associated with a number of forest stands;
   determining a vegetative index (VI) value for the group of pixels in the first and second images associated with each forest stand;
   computing a relationship between the VI values determined from the first and second images;

comparing VI values determined for groups of pixels in the first image that are associated with forest stands to predicted VI values determined from the computed relationship for the pixels associated with the same forest stands in the second image to determine difference values; and using the difference values to identify forest stands in the area of interest that are exhibiting a growth rate that is faster or slower than predicted.

8. The non-transitory, computer readable storage media of claim 7, further including instructions for displaying the identified forest stands on a video monitor.

9. The non-transitory, computer readable storage media of claim 7, further including instructions for printing a list of the identified forest stands.

* * * * *